United States Patent [19]

Moyer

[11] Patent Number: 5,689,714

[45] Date of Patent: Nov. 18, 1997

[54] METHOD AND APPARATUS FOR PROVIDING LOW POWER CONTROL OF PERIPHERAL DEVICES USING THE REGISTER FILE OF A MICROPROCESSOR

[75] Inventor: William C. Moyer, Dripping Springs, Tex.

[73] Assignee: Motorola, Inc., Schaumburg, Ill.

[21] Appl. No.: 520,121

[22] Filed: Aug. 28, 1995

[51] Int. Cl.[6] .............................. G06F 1/32; G06F 13/00
[52] U.S. Cl. ............................. 395/750; 395/800
[58] Field of Search ................................ 395/800, 375, 395/775, 750; 364/707

[56] References Cited

U.S. PATENT DOCUMENTS

| | | | |
|---|---|---|---|
| 5,038,275 | 8/1991 | Dujari | 395/839 |
| 5,230,074 | 7/1993 | Canova, Jr. et al. | 395/750 |
| 5,249,266 | 9/1993 | Dye et al. | 395/162 |
| 5,280,592 | 1/1994 | Ryba et al. | 395/375 |
| 5,408,668 | 4/1995 | Tomai | 395/750 |
| 5,423,045 | 6/1995 | Kannan et al. | 395/750 |

Primary Examiner—Jack B. Harvey
Assistant Examiner—Sumati Lefkowitz
Attorney, Agent, or Firm—Keith E. Witek

[57] ABSTRACT

A method and apparatus for providing low power management of a data processing system (FIG. 1) involves a CPU (12) communicating to a register file (16) in a processor (10). The CPU (12) communicates low power control and status values to/from the register file (16) via internal register file buses that are separate from internal data busses and address buses (22–26) which communicate with external data busses and address buses (34–38). The low power control and status values are stored in internal register (16a and 16b) which are coupled directly to external pins (52 and 54) of the processor (10). The registers (16a and 16b) are part of the user programming model of the processor (10). The low power information communicated between CPU (16), register (16a and 16b) and the pins (52 and 54) is communicated with little or no bandwidth problems and is efficient due to the separation from buses (22–26).

20 Claims, 3 Drawing Sheets

METHOD AND APPARATUS FOR PROVIDING LOW POWER CONTROL OF PERIPHERAL DEVICES USING THE REGISTER FILE OF A MICROPROCESSOR

FIELD OF THE INVENTION

The present invention relates generally to data processing systems, and more particularly, to low power management which utilizes status and control registers within a central processing unit.

BACKGROUND OF THE INVENTION

Microcontroller integrated circuits are widely used today for many embedded and/or control applications. Typical microcontroller integrated circuits are required to communicate with on-chip and off-chip peripherals in order to effectively perform specific tasks. Communication of information from a packaged microcontroller which is formed on an integrated circuit is usually performed through a data bus or one or more output ports. The use of output ports and/or a data bus to communicate to an external environment is not always advantageous.

The data bus of a microcontroller will be used to carry an abundance of information. The data bus is used not only to interface with peripherals, but to read data from memory, write data to memory, execute software, and the like. The data bus will usually continually be in use reading operand and operation information so that the microcontroller can execute software to perform its function. Therefore, controlling a peripheral in address space by accessing data in the peripheral through the data bus is limited by bandwidth and can be inefficient. Control registers and status registers to monitor and control peripheral activity may also be stored in external memory and require access via the data bus. Therefore, memory stored registers to control and monitor peripherals may also be bandwidth limited and inefficient.

IO ports have been designed to alleviate some of the band width problems associated with using the data bus for many functions. However, IO ports are frequently memory-mapped or are accessed internal to the microcontroller integrated circuit by the same internal data bus used to access the external data bus. Therefore, the CPU internal to the microcontroller integrated circuit will have a difficult time accessing IO ports in a manner similar to accessing register and status information in external memory.

There exists a need in the industry to allow for a rapid status and control access between a peripheral device and the CPU of a microcontroller.

DESCRIPTION OF THE PREFERRED EMBODIMENT

Generally, the present invention comprises a method and an apparatus for allowing a microcontroller CPU to communicate effectively and efficiently with external peripheral devices. In order to provide effective and efficient communication, the CPU is located on an integrated circuit die along with a register file. The register file is the user's programming model of the microcontroller. The CPU writes to the register file via internal buses that are independent and distinct from the internal data bus and address bus used by the CPU to access data and software for execution. The register file contains a plurality of registers such as one or more program counters (PCs), one or more status registers such as a floating point status register, one or more base registers such as a vector base register, and like on-chip registers. In particular, the register file contains a global control register (GCR) and a global status register (GSR). The global control register is part of the internal register file of the microcontroller and is coupled directly to output pins of the integrated circuit. The global status register, while being part of the users programming model and register file, is directly coupled to status input pins of the integrated circuit. Therefore, a programmer can write code that communicates directly to the global status register and the global control register, which are within the users programming model, via internal data address and control buses to allow for efficient communication to an external environment without the bandwidth limitations of the prior art. In addition, the bus controller 14 (see FIG. 1) which drives the external address and data buses coupled to the data processor 10 may be non-functional or in a low power mode of operation while not inhibiting the operation of the power management signals communicated through the register file 16 to the external peripherals 46, 48 and 50.

The method and apparatus described above can be further understood with reference to FIGS. 1–3 discussed below.

Figure 1:
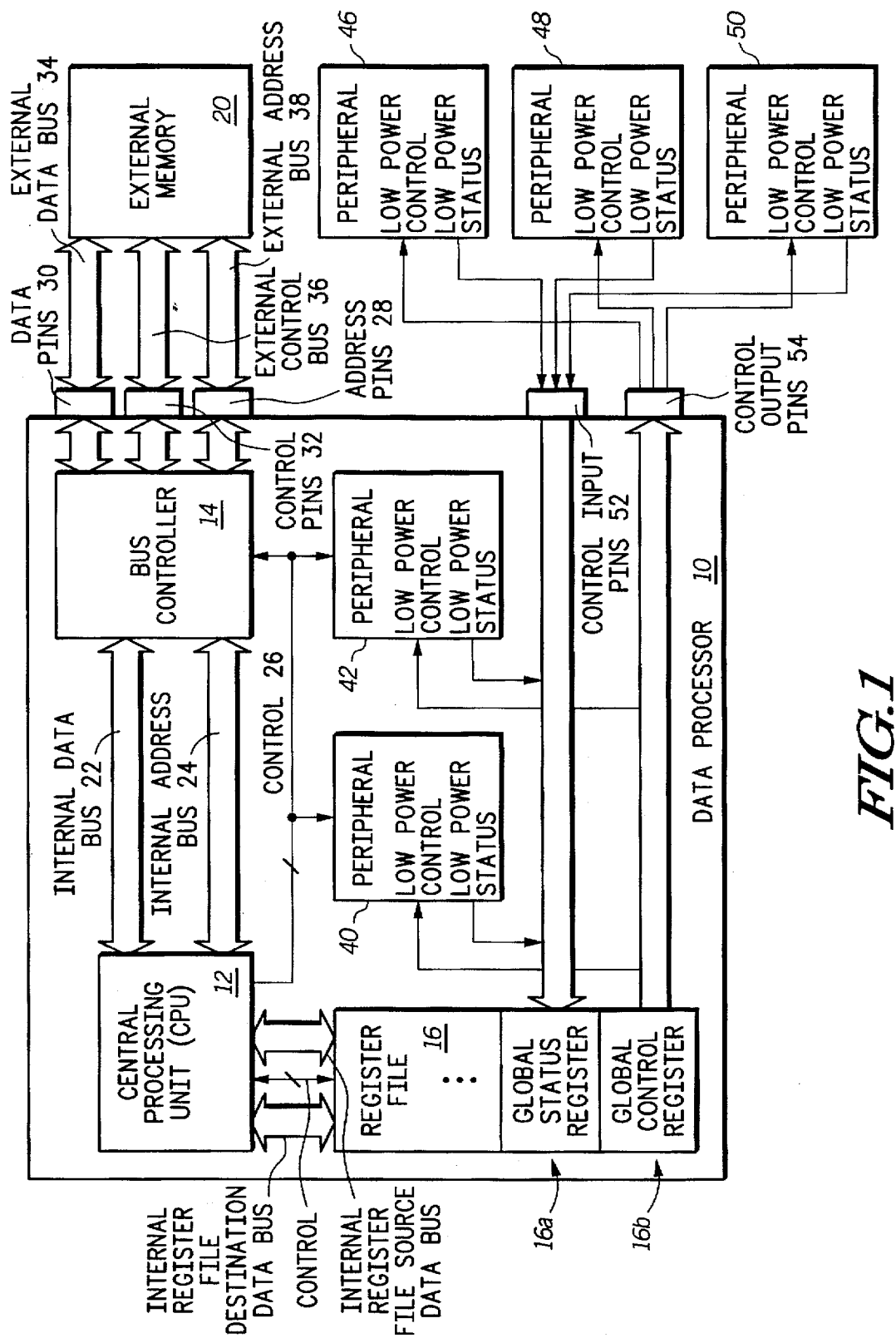
FIG. 1 illustrates, in a block diagram, a system for allowing rapid status and control access between a peripheral device and the CPU of a microcontroller in accordance with the present invention.

FIG. 1 illustrates a data processor 10 that is a microcontroller or microprocessor system. Data processor 10 has a CPU 12 which is coupled to a bus controller 14. The CPU 12 is coupled to the bus controller 14 via an internal data bus 22, an internal address bus 24, and a control bus 26. The bus controller 14 communicates the data, address, and control information received via buses 22–26 to data pins 30, control pins 32, and address pins 28. Every element illustrated in FIG. 1 as being within the data processor 10 is formed on a single substrate and packaged in a material which provides for external pins or terminals such as data pins 30, control pins 32, and address pins 28. Therefore, the pins 28–32 allow the on-chip resources, such as the CPU 12 and the bus controller 14, to communicate to an environment external to the data processor 10. "Pins" may refer to solder bumps, terminals, conductive contact pads, or any external interconnect media.

The bus controller 14 communicates with an external data bus 34, an external control bus 36, and an external address bus 38, via the pins 28–32. The external buses 34–38 are connected to an external memory 20. External memory 20 is used to store opcodes and operands for access and execution by the CPU 12.

The CPU is coupled to the register file 16 via internal source and destination data buses and a control bus illustrated in FIG. 1. The register file 16 communicates with CPU 12 via these internal buses wherein the internal buses between the CPU 12 and register file 16 are independent and separated from the buses 22–26 in FIG. 1. The register file contains a plurality of registers on-chip within the data processor 10. The register file contents are further illustrated in FIG. 3. The register file 16 is accessed by an instruction referred to as a MOVEC (move control) instruction. Therefore, the internal buses used to communicate to the register file 16 are accessed via instructions that are different from the instructions used to access the data bus 22 and the address bus 24. Within the register file 16 is a global status register 16a and a global control register 16b. The CPU can write information directly to the global control register via the MOVEC instruction. In addition, the CPU can read information directly from the global status register via the MOVEC instruction. The register file 16 contains registers that are part of the users programming model of the data processor 10.

Any information written to the global control register 16b is communicated directly to external control pins 54. Therefore, the CPU 12 can write information directly to the global control register 16b in order to directly control binary logic values of output pins of the data processor 10. These logic values of the output pins 54 can then be directly used to provide control information to external peripherals 46, 48 and 50. In addition to using the global control register 16b to provide control signals to external peripherals, register 16b can also be used to provide control signals to peripherals which may be internal to the data processor 10 and on-chip with the CPU 12. These on-chip peripherals are illustrated by peripherals 40 and 42 in FIG. 1.

FIG. 1 specifically illustrates that the global control register is used to provide low power control information to peripheral devices. The peripheral devices 40, 42, 46, 48, and 50 provide status information to the global status register 16a. Global status information provided by external peripherals 46-50 are provided through status input pins 52 where status input pins 52 are external terminals of the data processor 10. (status input pins 52 are also referred to as control input pins 52) Once status information is provided to register 16a, information may be read from the status register 16a via the internal register file source bus and the internal register file control bus. Therefore, the CPU can receive efficient and quick status information from external peripherals. The status information inherent in FIG. 1 is illustrated as providing peripheral feedback regarding the peripheral's low power mode(s) of operation. Therefore, in the aggregate, FIG. 1 allows a CPU to effectively control the power consumption of a complicated system without being limited by the bus controller resources or the limited bandwidth of the heavily-used external buses 34-38. In addition, the low power management system of FIG. 1 is not inhibited by the high band width and utilization of the internal buses 22-26 which are located internal to the data processor 10.

In order to perform low power monitoring and management, the CPU will write control values to the global control register 16b. In a preferred form, the registers located in the register file 16 are 32-bit registers. However, other sized registers such as 64-bit registers may also be used. By using 32-bit registers in the register file 16, global control register 16b can be used to provide 32 distinct low power control bits to peripherals 40-50. Therefore, one or more control bits from the control register 16b are coupled to one or more of the peripherals 40-50 to communicate to the peripherals whether they are to operate in a normal mode of operation, a low power mode of operation, or some hybrid mode of operation which is between a lowest power mode of operation and a highest-powered normal mode of operation. Once peripheral devices in FIG. 1 have been instructed via the control register 16b to change or modify a method of operation or power consumption, the global status register 16a is used to monitor the activity of the peripherals. The global status register 16a allows feedback so that the CPU 12 can effectively and efficiently control subsequent operations of the peripheral devices.

Figure 2:
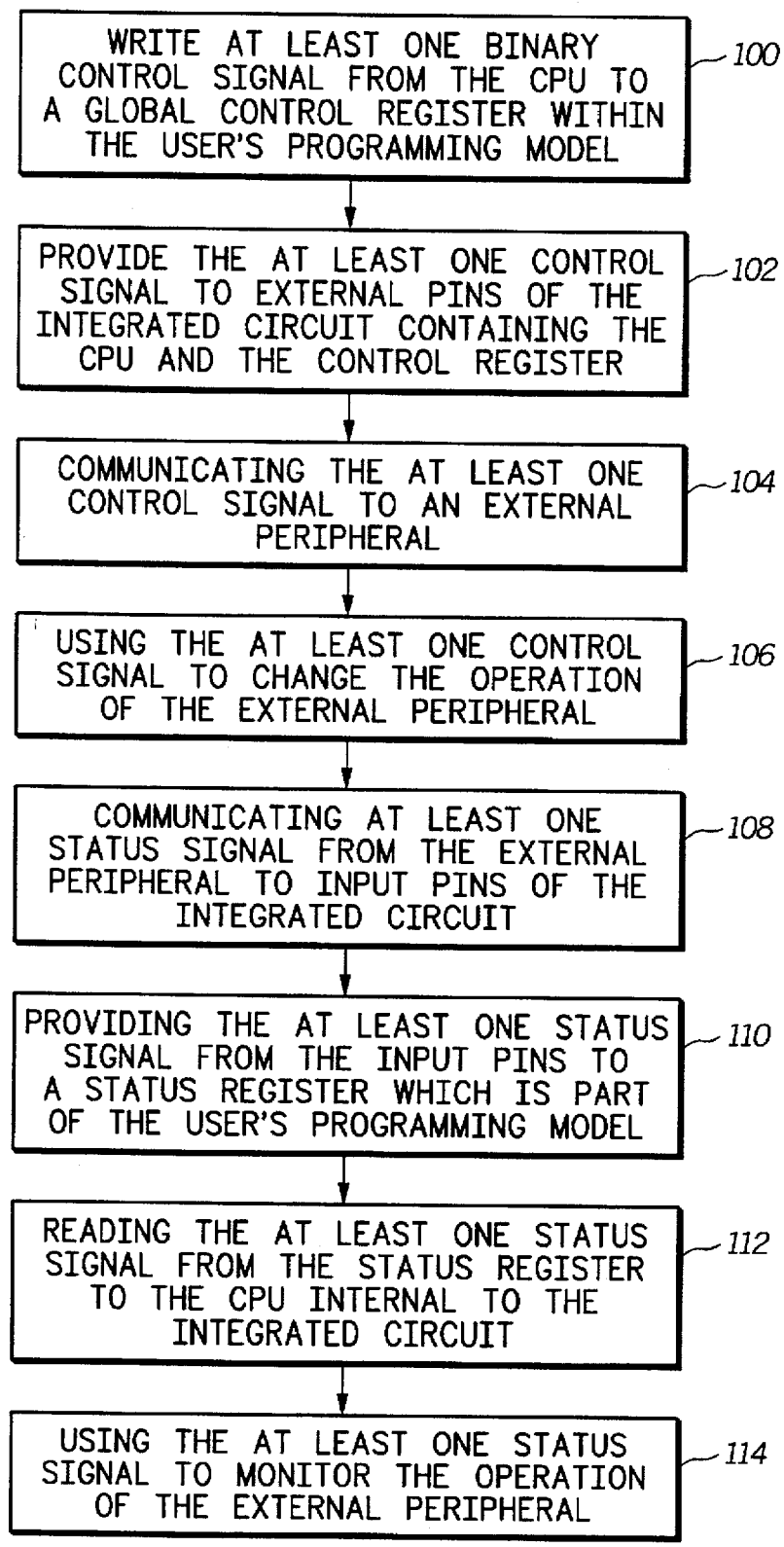
FIG. 2 illustrates, in a flowchart, a method for communicating information between a peripheral and an on-chip CPU in an efficient manner in accordance with the present invention.

FIG. 2 is a flow chart which describes a method that can be used by the data processor 10 of FIG. 1 for providing status and control operations for low power management. In a step 100, at least one binary control signal is written from the CPU 12 to a global control register 16b within the register file 16. After the step 100, a step 102 allows binary values from the control register 16b to be communicated to control output pins 54 via optional buffer circuitry. Step 104 indicates that these control signals are then further conducted to communicate directly to input pins of peripheral devices. In a step 106, the peripheral devices receive the at least one control signal and alters a peripheral mode of operation in accordance with the signals provided via the register 16b. In a step 108, the peripheral devices of FIG. 1 periodically communicate status information to a plurality of input pins 52. The plurality of status signals are communicated and written into a global status register 16a via a step 110. In a step 112, the CPU performs a read operation to access the information stored in the status register 16a. The read and write operations from the CPU to the register 16a and 16b are performed via special internal dedicated bus resources. Once the CPU receives status information from the register 16A, the CPU can use the status information received from the peripherals to change the peripherals status, continue the existing peripheral status, or continue monitoring the progress of a peripheral device.

Figure 3:
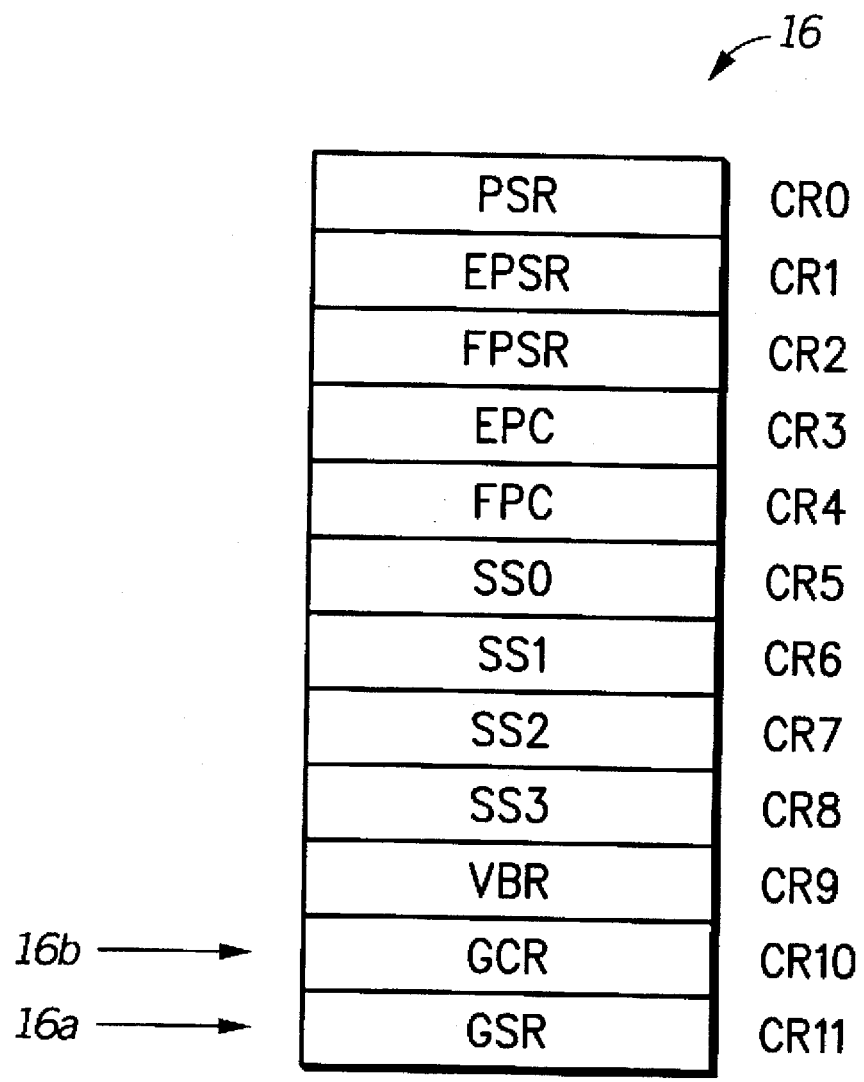
FIG. 3 illustrates, in a block diagram, the register file illustrated in FIG. 1.

FIG. 3 illustrates the registers used in the register file 16. FIG. 3 illustrates a processor status and control register (PSR) which is used to control supervisory/user modes, indicate byte ordering, allows debugging by setting a serial mode, handles carry bit(s), etc.. The exception process status register (EPSR) is used to indicate the status of exceptions/ interrupts in the system. The fast-exception process status register (FPSR) is used to indicate the status of fast exceptions in the system. The exception program counter (EPC) is a shadow register for use when performing exception handling. The fast exception program counter (FPC) register is used to shadow the program counter for processing fast exceptions. The supervisory scratch registers (SS0-SS4) are used in supervisory mode. The vector base register (VBR) is a register which indicates where the exception vector registers are located in address space. The global control register (GCR) and the global status register (GSR) are discussed herein.

While the present invention has been illustrated and described with reference to specific embodiments, further modifications and improvements will occur to those skilled in the art. For example, plurality as used herein is intended to mean and value between two and infinity and should not be limited to any particular constant or sub-range. More than one GSR and more than one GCR may be used with the data processor taught herein. Buses and registers can be any size in width. The above teachings can be utilized for any control methodology and is not limited just to low power control. The low power signals and control taught herein can extend further than just low power control/monitoring to a broader category of overall power management. It is to be understood, therefore, that this invention is not limited to the particular forms illustrated and that it is intended in the appended claims to cover all modifications that do not depart from the spirit and scope of this invention.

What is claimed is:

1. A data processor formed on an integrated circuit, the data processor comprising:

a central processing unit (CPU);

a data bus coupled from the CPU to external terminals of the integrated circuit for communicating with peripherals external to the data processor;

a plurality of registers internal to the CPU;

an internal bus coupling the data processor to the plurality of registers so that read and write operations can be performed directly to the plurality of registers via the internal bus without using the data bus;

a low power control bus, separate from the internal bus, coupling the plurality of registers directly to external low power control pins of the integrated circuit;

a plurality of input terminals of the integrated circuit coupled to a status register wherein the status register is one register within the plurality of registers; and a plurality of output terminals of the integrated circuit coupled to a control register wherein the control register is one register within the plurality of registers, wherein a first CPU instruction is used to access the data bus and a second CPU instruction different from the first CPU instruction is used to access the control register and the status register, the second CPU instruction allowing the plurality of registers to be written with low power information which controls low power operation of peripherals through the external low power control pins of the integrated circuit.

2. The data processor of claim 1 wherein the plurality of output terminals are coupled to a plurality of peripheral devices external to the integrated circuit.

3. The data processor of claim 2 wherein the plurality of output terminals are used to transmit power management control signals to the plurality of peripheral devices external to the integrated circuit.

4. The data processor of claim 3 wherein the plurality of output terminals are used to transmit power management control signals to the plurality of peripheral devices external to the integrated circuit to direct at least one peripheral device in the plurality of peripheral devices to enter into a power management mode of operation wherein the at least one peripheral device consumes power at a lower rate than normal.

5. The data processor of claim 1 wherein the plurality of input terminals are coupled to a plurality of peripheral devices external to the integrated circuit.

6. The data processor of claim 5 wherein the plurality of input terminals are used to receive power management status information from the plurality of peripheral devices external to the integrated circuit.

7. The data processor of claim 6 wherein the plurality of input terminals are used to receive power management status information from the plurality of peripheral devices external to the integrated circuit to allow at least one peripheral device within the plurality of peripheral devices to communicate a wake-up signal to the CPU, the CPU bringing the at least one peripheral device out of a power management mode of operation in response to the wake-up signal.

8. A data processing system comprising:

a central processing unit (CPU) located on an integrated circuit;

a data bus coupled from the CPU to external terminals of the integrated circuit for communicating with peripherals external to the CPU;

a plurality of registers located on the integrated circuit;

an internal bus coupling the CPU to the plurality of registers so that read and write operations can be performed directly to the plurality of registers via the internal bus without using the data bus, the internal bus being located totally within the integrated circuit;

a plurality of input terminals of the integrated circuit coupled to a status register wherein the status register is one register within the plurality of registers, the status register being capable of being read by the CPU;

a plurality of output terminals of the integrated circuit coupled to a control register wherein the control register is one register within the plurality of register, the control register being capable of being written with low power control information by the CPU, wherein a first CPU instruction is used to access the data bus and a second CPU instruction different from the first CPU instruction is used to access the control register and the status register; and a plurality of peripheral devices having output terminals coupled to the plurality of input terminals of the integrated circuit and having input terminals coupled to the plurality of output terminals of the integrated circuit, the control register and status register using the plurality of input terminals and plurality of output terminals of the integrated circuit to control a low power mode of the plurality of peripheral devices.

9. A method for controlling a low power mode of operation of a plurality of peripheral devices coupled to a microprocessor, the method comprising the steps of:

providing a plurality of low power control signals from a central processing unit of the microprocessor to a control register internal to the microprocessor via a first internal bus that is internal to the microprocessor, the first internal bus being separate from a data bus used by the microprocessor to communicate with external memory;

providing the plurality of low power control signals to a plurality of output terminals from the control register within the microprocessor;

communicating the plurality of low power control signals from the plurality of output terminals to the plurality of peripheral devices so that at least one of the peripheral devices in the plurality of peripheral devices enters into a low power mode in response to the plurality of low power control signals;

communicating a plurality of low power status signals from the plurality of peripheral devices to a plurality of input terminals of the microprocessor;

providing the plurality of low power status signals from the plurality of input terminals to a status register internal to the microprocessor; and providing the plurality of low power status signals from the status register to the central processing unit of the microprocessor so that the central processing unit is able to monitor the low power status of the plurality of peripheral devices.

10. The method of claim 9 wherein the step of providing the plurality of low power status signals from the status register to the central processing unit of the microprocessor comprises:

providing the low power status signals via a second internal bus that is different from the first internal bus and different from the data bus.

11. The method of claim 9 wherein the step of providing the status signals from the status register to the central processing unit of the microprocessor comprises:

providing the low power status signals via the first internal bus wherein the first internal bus allows for bi-directional communication so that data can be written to the control register and read from the status register in mutually exclusive time periods.

12. The method of claim 9 wherein the status register is part of an internal register model of the microprocessor.

13. The method of claim 12 wherein the status register is accessed by a first instruction executed by the central processing unit and the data bus is accessed via a second instruction executed by the central processing unit where the first instruction is a different instruction from the second instruction.

14. The method of claim 9 wherein the control register is part of an internal register model of the microprocessor.

15. The method of claim 14 wherein the control register is accessed by a first instruction executed by the central processing unit and the data bus is accessed via a second instruction executed by the central processing unit where the first instruction is a different instruction from the second instruction.

16. The method of claim 9 wherein the control register provides output binary values to the plurality of output terminals and the status register receives input binary values from the plurality of input terminals in an parallel manner.

17. The method of claim 9 wherein one low power control signal in the plurality of low power control signals is provided to one peripheral device in the plurality of peripheral devices so that each peripheral device in the plurality of peripheral devices receives one low power control signal.

18. The method of claim 9 wherein one low power status signal in the plurality of low power status signals is received from one peripheral device in the plurality of peripheral devices so that each peripheral device transmits one low power status signal.

19. A data processing system formed on an integrated circuit comprising:

a central processing unit (CPU);

a plurality of registers coupled to the CPU via an internal bus that is not directly accessible outside of the integrated circuit; and a plurality of data terminals on an external portion of the integrated circuit wherein a data bus couples the plurality of data terminals to the CPU, wherein a first opcode is executed by the CPU to access the plurality of registers via the internal bus and a second opcode is executed to access the data bus wherein the first opcode is a different opcode from the second opcode, and wherein a first register in the plurality of registers is coupled to a plurality of output terminals of the external portion of the integrated circuit and a second register in the plurality of registers is coupled to a plurality of input terminals of the external portion of the integrated circuit, and wherein the first register and the second register are used to provide low power control information to a plurality of peripheral devices and receive low power status information from the plurality of peripheral devices, respectively, so that a power consumption of the plurality of peripheral devices is controlled.

20. The data processing system of claim 19 wherein the first register and the second register are also used to control a low power operation of a peripheral device that is integrated on a same substrate used to form the CPU.

* * * * *